Sept. 9, 1969   HISAO FUTAKI ET AL   3,466,465
SWITCHING DEVICE USING CRITICAL TEMPERATURE THERMISTOR
Original Filed Aug. 21, 1964   2 Sheets-Sheet 1

HISAO FUTAKI
KAZUTOSHI IKEGAMI
INVENTORS

BY Bierman & Bierman

Hisao Futaki
Kazutoshi Ikegami
INVENTORS

BY Bierman & Bierman

United States Patent Office 3,466,465
Patented Sept. 9, 1969

3,466,465
SWITCHING DEVICE USING CRITICAL
TEMPERATURE THERMISTOR
Hisao Futaki, Musashino-shi, and Kazutoshi Ikegami, Tokyo-to, Japan, assignors to Kabushiki Kaisha Hitachi Seisakusho, a joint-stock company of Japan
Original application Aug. 21, 1964, Ser. No. 391,129. Divided and this application Jan. 26, 1967, Ser. No. 627,282
Int. Cl. H03k 17/56, 17/74
U.S. Cl. 307—248                                       4 Claims

ABSTRACT OF THE DISCLOSURE

A semiconductor switching device using a critical temperature thermistor having an oxide body and four lead wires embedded in the body, one of the lead wires constituting an anode and the other three lead wires cathodes, in which a densely concentrated current flowing from the anode wire to one of the cathode wires located in one side of the group of the cathode wires can be shifted to the other cathode wire located in the opposite side of the group by applying a triggering signal to the centrally located cathode wire, whereby a flip-flop action can be performed. Furthermore, by connecting a plurality of the flip-flop circuits in parallel sequential arrangement, a counter, for example, a Dekatron, is constituted.

---

This application is a divisional application of co-pending application Ser. No. 391,129 filed Aug. 21, 1964, now U.S. Patent No. 3,328,722.

This invention relates to new construction of and circuit arrangements for a thermistor element using a thermistor material, the electrical resistance of which varies abruptly within a specific temperature range and is suitable for high-frequency oscillation or switching.

It is an object of the present invention to provide a new thermistor element of the above stated character having extremely miniature size, high response, high mechanical strength, long life, adaptability to mass production, whereby the manufacturing cost can be reduced, and applicability to a large number of practical and effective uses.

It is another object to provide circuit arrangements for utilization of the above stated thermistor element, said circuit arrangements being extremely simple and stable in operation.

The nature, principle, and utility of the invention will be best understood by reference to the following description taken in conjunction with the accompanying drawings in which like parts are designated by like reference characters, and in which.

Figure 1:
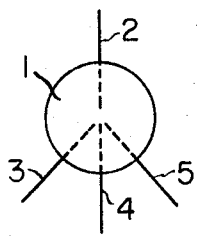
FIG. 1 is a simplified diagram indicating the essential construction of a thermistor element suitable for use according to the invention.
Figure 2:
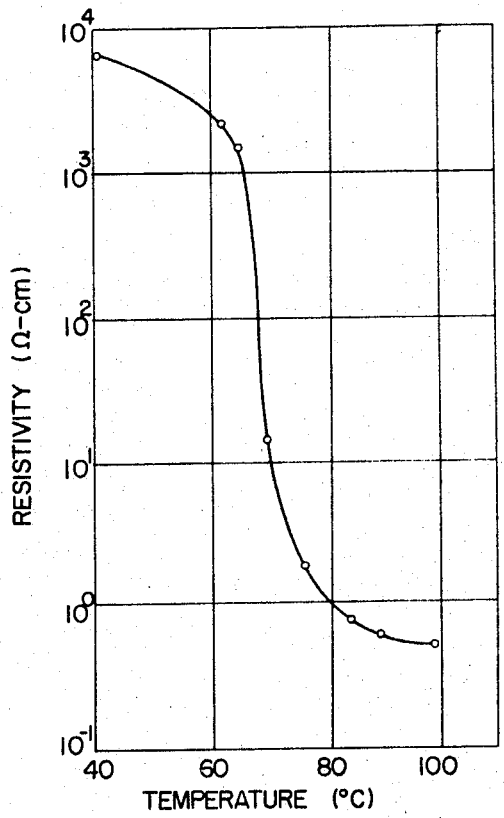
FIG. 2 is a graphical representation indicating the resistivity versus temperature characteristics of a critical temperature thermistor.

The construction of a thermistor element constructed particularly for use in a semiconductor Dekatron is shown in FIG. 1. As shown, in an oxide semiconductor 1 exhibiting abrupt variation in electrical resistance characteristic as shown in FIG. 2, there are imbedded the ends of a platinum lead wire 2 to constitute the anode on one side and a plurality of platinum lead wires 3, 4, and 5 to constitute the cathode on the other side, said ends being overlapped in respectively different planes in an arrangement for concentration of the electric field. A switching element is thereby formed.

The oxide semiconductor 1 having an electrical resistance versus temperature characteristic is produced from a mixture of vanadium oxide as its principal constituent and an added substance such as a basic metallic oxide or an acidic oxide or fabricated from a sulfide semiconductor of the silver sulfide, or copper sulfide system, and its electrical resistance varies widely by 3 to 4 digits in the critical temperature region.

The method for producing a thermistor element having the structure as shown in FIG. 1 comprises the steps of arranging four wires 2 to 5 of platinum or palladium as shown in FIG. 1, applying an oxide semiconductor powder in paste form as straddling the four wires 2 to 5 to form the bead 1, and sintering the bead 1. According to the invention the lead wires 2–5 are arranged so as to cause a densely concentrated electric field between the anode 2 and each one of the cathode wires 3–5 within the bead interior. In the construction of the thermistor, since, when a voltage is applied between the anode 2 and one of the cathode wires 3–5, a densely concentrated electric field is caused therebetween, one part of the oxide semiconductor 1 between the wires is locally heated by an initial current, and the conductivity of the locally heated part of the bead 1 increases. Furthermore, since a critical temperature thermistor has the characteristic of an abrupt change in resistance due to temperature, the local heating becomes even more extreme, and the current path becomes concentrated in an extremely small spot, probably of a diameter of 1 micron or smaller.

Figure 3:
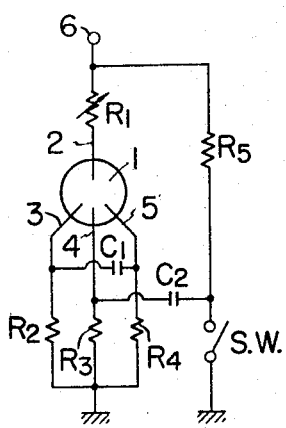
FIG. 3 is a circuit diagram showing a flip-flop circuit according to the invention, wherein a critical temperature thermistor is used.

As shown in FIG. 3, this element shown in FIG. 1 is used in a flip-flop circuit, wherein the lead wire 2 is connected by way of a variable resistance $R_1$ to a terminal 6, and the lead wires 3, 4 and 5 are connected by way of respective resistances $R_2$, $R_3$, and $R_4$, connected in series thereto, to a common junction. The lead 4 is connected by way of a capacitor $C_1$ to the lead 5, and the lead 4 is connected by way of a capacitor $C_2$ and a resistance $R_5$ to the said terminal 6.

Figure 4:
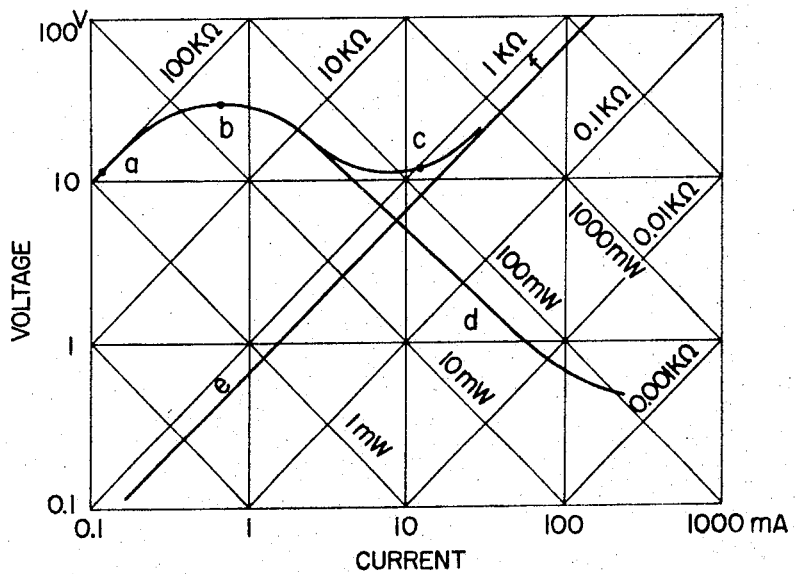
FIG. 4 is a graphical representation indicating the voltage versus current characteristic of a thermistor element, and presented for the purpose of description of the flip-flop circuit shown in FIG. 3.

The current-voltage characteristic of the above mentioned thermistor element is graphically indicated in FIG. 4. In this graph. $a$–$b$–$d$ represents the characteristic curve of only the semiconductor thermistor 1; $e$–$f$ represents the characteristic curve of only the series-connected resistances; and $a$–$b$–$c$ represents the characteristic curve resulting from the combination of the two first stated characteristics.

As is apparent from this graph, when the voltage point $b$ is passed, the characteristic approaches that of a full negative resistance, and the product of current and voltage becomes almost constant.

This example device operates in the following manner. Referring again to FIG. 3, the resistances $R_2$, $R_3$, and $R_4$ are selected to be of equal value, and $+E_b$ is applied to the terminal 6. Then, when the variable resistance $R_1$ is gradually reduced in resistance value, a current flows either between the element electrodes 2 and 3 or between the electrodes 2 and 5. That is, as represented in FIG. 4, the voltage peak is passed.

If, as a supposition, a current (for example, 10 ma.) is assumed to flow between the electrodes 2 and 3, stabilization will be established at the point $c$ in FIG. 4, and the currents flowing between the electrodes 2 and 4 and between the electrodes 2 and 5 at this time will be very small and will be in a stable state at point $a$ in FIG. 4.

If, at this time, the pulse switch designated by the reference character SW is closed instantaneously, the charged voltage in the capacitor $C_2$ will be discharged through the resistance $R_3$. However, since the voltage direction of this discharge is such as to cause the potential of the lead 4 to be lower than that of the lead 3, the current between the leads 2 and 3 tends to shift to a current between the leads 2 and 4. However, since the capacitor $C_1$ is inserted between the leads 3 and 5, and the potential of the lead 5 is lower than that of the lead 4, the current between the leads 2 and 3 flows instantaneously between the leads 2 and 4 and switches to become a current between the leads 2 and 5, whereby it stabilizes at the point $c$ in FIG. 4.

On one hand, the current between the leads 2 and 3 coincides, inversely, with the point $a$. The transfer speed in this case is 1 microsecond.

Then, if the switch SW is again closed, an operation which is exactly opposite that described above will be caused to take place, and the flow of current within the element will return to the initial state. A flip-flop operation is thereby carried out in this case.

Figure 5:
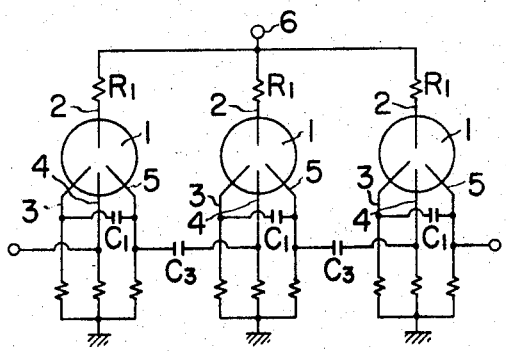
FIG. 5 is a circuit diagram showing a circuit formed by the combination of a plurality of thermistor elements according to the invention.

FIG. 5 shows an example of a counter circuit consisting of a parallel combination of a plurality of circuits each as shown in FIG. 3. That is, by combining 9 unit circuits, a decimal counter circuit as in a Dekatron can be formed.

The present invention, furthermore, is suitably applicable to various kinds of counting devices and affords miniaturization, particularly of electronic computers, and moreover, improvement of their performance.

We claim:

1. A semiconductor switching device comprising:
a critical temperature thermistor having the characteristic whereby the variation of its electrical resistance with respect to temperature variation is abrupt within a specified temperature range and having first, second, third, and fourth lead wires arranged to cause the electric field established at the time of operation of the thermistor to be in a densely concentrated state in one part of the thermistor;
a variable resistance through which the first lead wire is connected to a terminal;
three resistances connected in series to the second, third, and fourth lead wires respectively, the second, third, and fourth lead wires being grounded each through the respective resistances;
a capacitor connected between said terminal and said third lead wire; and
a capacitor connected between the second and fourth lead wires.

2. A counter circuit comprising:
a plurality of critical temperature thermistors in parallel sequential arrangement, each having the characteristic whereby the variation of its electrical resistance with respect to temperature variation is abrupt within a specified temperature range and having first, second, third, and fourth lead wires;
a plurality of resistances, one of which is provided for each thermistor and connected between the first lead wire of that thermistor and a common terminal;
three resistances which are connected respectively in series between the second, third, and fourth lead wires of each thermistor and a ground terminal;
a capacitor provided for each thermistor and connected between the second and fourth lead wires of that thermistor; and
capacitors, one of which is connected between the fourth lead wire of each thermistor and the third lead wires of the sequentially adjacent thermistor in the said parallel sequential arrangement.

3. A switching device comprising:
a critical temperature thermistor including
a body of critical temperature thermistor material having the characteristic whereby the variation of the electrical resistance thereof with respect to temperature variation is abrupt within a specified temperature range,
an anode electrode connected to said body,
first, second and third electrodes of a cathode connected to said body, each of the electrodes of the cathode being arranged so as to be opposed to said anode electrode in the vicinity thereof, said second electrode being disposed between said first and third electrodes;
three resistances connected respectively in series to the first, second and third electrodes of the cathode, said first, second and third electrodes being connected to a common reference potential each through the respective resistances;
a capacitor connected between said first and third electrodes of the cathode;
means for applying to said anode electrode an electrical power sufficient to cause a densely concentrated current flow in one part of said body between said anode electrode and one of the first and third electrodes; and
means for applying to said second electrode a trigger signal to shift said densely concentrated current flow to another part of said body between said anode electrode and the other of the first and third electrodes.

4. A counter circuit comprising;
a plurality of switching devices in parallel sequential arrangement, each of the switching devices including
a critical temperature thermistor having a body of critical temperature thermistor material having the characteristic whereby the variation of the electrical resistance thereof with respect to temperature variation is abrupt within a specified temperature range, an anode electrode connected to said body, first, second and third electrodes of a cathode connected to said body, each of the electrodes of the cathode being opposed to said anode in the vicinity thereof, said second electrode being disposed between said first and third electrodes,
three resistances connected respectively in series to the first, second and third electrodes of the cathode, said first, second and third electrodes being connected to a common reference potential each through the respective resistances, and
a capacitor connected between said first and third electrodes of the cathode;
means for applying to each of said anode electrodes an electrical power sufficient to cause a densely concentrated current flow in one part of the body of each thermistor between the anode electrode and one of the first and third electrodes;
means for applying to the second electrode of the thermistor in the first stage in said parallel sequential arrangement of said switching devices a trigger signal to shift the densely concentrated current flow to another part of the body between the anode electrode and the other of the first and third electrodes of the thermistor in said first stage; and capacitors, one of which is connected between the third electrode of each thermistor and the second electrode of the sequentially adjacent thermistor in said parallel sequential arrangement.

References Cited

UNITED STATES PATENTS 3,199,087   8/1965   Foglia  ---------- 307—310 X
3,376,433   4/1968   Robbins  ---------- 307—258 X JOHN S. HEYMAN, Primary Examiner U.S. Cl. X.R.

307—224, 225, 272 279, 299